March 13, 1934.  O. N. BRYANT  1,950,594
LOAD RESPONSIVE CONTROL
Filed April 28, 1933  2 Sheets-Sheet 1

WITNESSES:
James K. Mosser
E. Lutz

INVENTOR
O. N. BRYANT.
BY
a. B. Reavis
ATTORNEY

March 13, 1934.  O. N. BRYANT  1,950,594

LOAD RESPONSIVE CONTROL

Filed April 28, 1933   2 Sheets-Sheet 2

WITNESSES:
James K. Mosser
E. Lutz

INVENTOR
O. N. BRYANT.
BY
R. B. Ruris
ATTORNEY

Patented Mar. 13, 1934

1,950,594

UNITED STATES PATENT OFFICE 1,950,594

LOAD RESPONSIVE CONTROL

Ozro N. Bryant, Prospect Park, Pa., assignor to Westinghouse Electric & Manufacturing Company, East Pittsburgh, Pa., a corporation of Pennsylvania Application April 28, 1933, Serial No. 668,438

4 Claims. (Cl. 264—4)

My invention relates to a control mechanism for a prime mover, more particularly to a load-responsive control for a prime mover, and it has for its object to provide a mechanism of this character which will minimize the increase in speed upon a sudden removal or decrease in the load thereof.

My invention is adapted, more particularly, to a steam turbine of large capacity driving an electric generator. While carrying full or a heavy load, the quantity of steam in the casing is very great, and the admission valve or valves are fully open, or nearly so, and admit large quantities of steam. In the event that the circuit breaker connecting the generator opens, the entire load on the turbine-generator unit is removed, and the speed thereof is increased by the large quantity of steam in the turbine casing and the steam admitted through the open admission valves. A short but appreciable period of time is required, after such event, for the speed to accelerate to the point at which the governor acts to close the admission valves, during which period of time the admission valves remain open and admit an amount of steam, which, together with the steam in the casing at the moment of load removal, is sufficient to produce an overspeed great enough to effect operation of the auto-stop governor. It is desirable to avoid operation of the auto-stop governor, as this requires resetting thereof, and also manual operation of the massive throttle valve before the unit can be restarted, and this objective is attained by mechanism responsive to exceeding a predetermined rate of change of declining load to supersede the governor and move the admission valve in a closing direction.

The steam in the casing at the moment of load drop may be sufficient to increase the speed somewhat above the normal operating speed, but it is not enough to increase the speed sufficiently to operate the auto-stop governor. A control mechanism, therefore, which effects closing of the admission valve during the interval of time between the moment of load drop and the increase in speed to the point where the governor will shut the admission valves, will avoid operation of the auto-stop governor.

In accordance with my invention, I provide a prime mover, for example, a steam turbine, having an admission valve controlled by a governor and having a throttle valve which closes in response to the attainment of a predetermined overspeed, together with means responsive to a predetermined rate of change of declining load to secure movement of the admission valve in a closing direction quickly enough to avoid attainment of a speed sufficient to operate the overspeed governor to close the throttle valve, it being desirable to avoid closing the throttle valve so far as possible because of the consequent "outage" of the machine incident to reopening of the throttle valve and placing the machine back on the line. As the governor moves the admission valve in accordance with speed and as speed is a function of load, it will be apparent that a controlling effect derivable from the rate of change of load will be much quicker, that is, a rate of change of load of considerable magnitude may occur before there is any substantial speed change. For example, in a given installation, it was found that, in case of load drop, it required three seconds for the governor to respond and close the admission valve, the governor, of course, requiring change in speed for its operation; and, at the higher loads, including full load, the machine would accelerate and operate the overspeed governor before the governor could respond to cut off or to diminish the supply of motive fluid. On the other hand, by providing means responsive to rate of change of declining load exceeding a predetermined rate, the admission valve was closed in the very short interval of the order of six tenths of a second. The means responsive to rate of change of load may take various forms, and I show, by way of example, one of the watt-meter type. The watt-meter includes a movable element whose position is a function of the load, and the factor of movement of the element taken in connection with a resistance factor jointly provide a control movement which depends upon the rate of change of load. More particularly, the watt-meter movable element works in conjunction with a dash-pot to secure movement of the control element, if the rate of load change exceeds a predetermined amount, this being determined by characteristics of the dash-pot, and such movement of the control element, against the force of suitable biasing means, brings about closing movement of the admission valve when the rate of change of declining load exceeds a predetermined amount, this operation taking place so quickly as to occur at a speed below the speed at which the overspeed governor is effective. The spring bias on the control member slowly moves it back to normal position so as to permit resumption of control by the governor.

The above and other objects are effected by my invention, as will be apparent from the following description and claims taken in connection with the accompanying drawings, forming a part of this application, in which:

Figure 1:
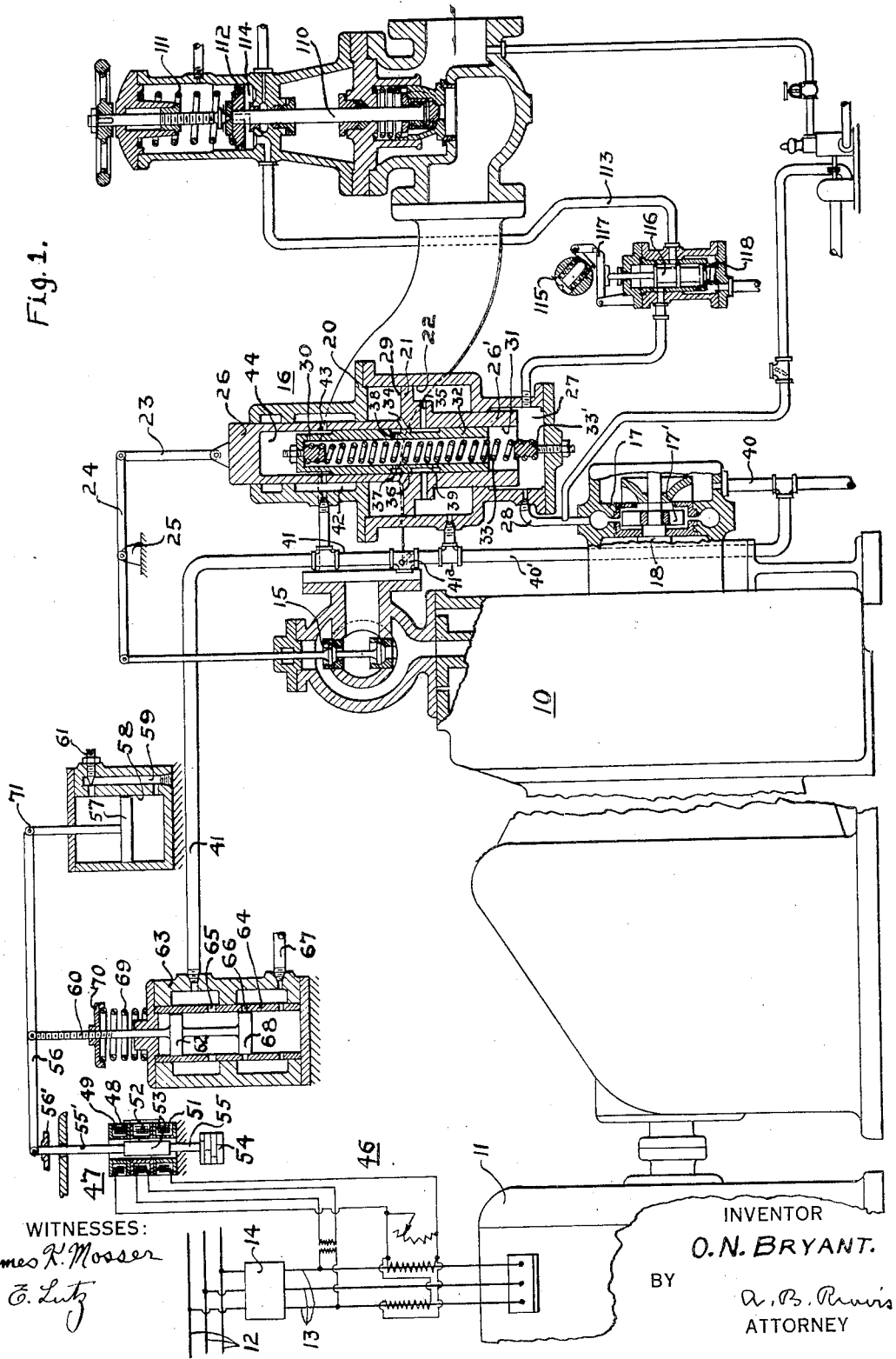
Fig. 1 is a diagrammatic view showing my novel control mechanism applied to a turbine driving an electric generator.

Referring now to the drawings more in detail, I show a steam turbine 10 which drives an electric generator 11. The generator 11 delivers electric current to the mains 12 through the leads 13, in which is interposed a circuit breaker, indicated at 14, adapted to disconnect the generator 11 from the mains 12 in the event of overload or other abnormal condition.

The turbine 10 is provided with an admission valve 15 operated by a fluid pressure governor 16, the latter being controlled by fluid pressure developed by a centrifugal pump 17 and varying as the square of the speed of the turbine. The pump 17 includes an impeller 17′, which may be mounted directly on the turbine rotor shaft 18, and it is supplied at its inlet with fluid from a conduit 40, preferably at a positive pressure, such as 5 to 7 pounds per square inch.

The fluid pressure governor 16 includes a casing 20 and a piston 21, the piston being disposed in a cylinder 22 formed in the casing. The piston 21 is connected to the admission valve 15 through a link 23, pivoted to an upper tubular extension 26 of the piston 21, and a lever 24, the latter being pivoted to a stationary part at 25. The piston 21 is also provided with a lower tubular extension 26′ extending into a chamber 27 in the lower end of the casing 20. The cross-sectional area of this tubular extension is subjected to the fluid pressure developed by the pump 17, which is conveyed to the governor 16 through a conduit 28. The upper face 29 of the piston 21 has an area greater than that of the extension 26′, and when fluid pressure is applied thereto, effects downward movement of the piston.

The piston 21 is provided with a cylindrical interior 31, in which is disposed a hollow cylindrical pilot valve 32 having a closed upper end. The pilot valve 32 is biased downwardly by a tension spring 33, connected at its upper end to the closed end of the pilot valve and at its lower end to a spring-holding member 33′ secured to the lower end of the casing 20. The pilot valve is subjected, on its lower side, in opposition to the spring force, to the fluid pressure developed by the pump 17, and assumes a position which is a function of the speed of the turbine, moving upwardly upon increase in speed and downwardly upon decrease in speed.

The piston 21 has an annular row of ports 34 providing communication between the upper end of the cylinder 22 and the cylindrical interior 31, and with a second row of annular ports 35 communicating between the lower end of the cylinder 22 and the cylindrical interior 31. The pilot valve 32 has a piston portion 36, which normally covers the row of ports 34. It also has an annular recess 37, disposed immediately above the piston portion 36 and supplied with fluid pressure from the chamber 27 through an annular row of ports 38, and below the piston portion 36, the pilot valve is provided with an elongated recess 39. The lower end of the cylinder 22 communicates with the pump supply conduit 40 through a conduit section 40′.

The pilot valve controls the operation of the piston 21 in the following manner:

Upon upward movement of the pilot valve from the position shown in the drawings, the ports 34 and 35 are placed in communication with each other. The piston 21 is moved upwardly by the fluid pressure on the lower end of the extension 26′ while the fluid in the cylinder 22 above the piston 21 is by-passed through ports 34, the recess 39 and the ports 35 to the lower end of the cylinder, until the piston 21 is again in a position, relative to the pilot valve, in which the ports 34 are covered by the piston portion 36, when further escape of fluid from the upper end of the cylinder 22 is cut off.

Upon downward movement of the pilot valve 32, fluid pressure is supplied through the ports 38, the recess 37, and the ports 34, to the upper end of the cylinder 22 and acts on the upper face of the piston 21 to move the same downwardly until the ports 34 are again covered by the piston portion 36. The fluid in the lower end of the cylinder 22 is conveyed through the conduit section 40′ to the conduit 40 during this movement.

As will be readily apparent from the drawings, upon an increase in speed of the turbine, the fluid pressure developed by the impeller 17 increases, moving the pilot valve 32 upwardly and effecting an upward movement of the piston 21 and a closing movement of the valve 15. Upon a decrease in speed, the fluid pressure decreases and permits the pilot valve 32 to be moved downwardly by the spring 33, effecting downward movement of the piston 21 and opening movement of the admission valve 15.

The pressure of the fluid supplied to the inlet of the pump 17 is communicated through the conduit section 40′ and a conduit 41, a recess 42 in the casing 20 and ports 43 in the tubular extension 26 of the piston 21 to the space 44 above the pilot valve 32, and acts on the pilot valve in opposition to the impeller pressure. The pressure delivered by the pump 17 varies with the variations in pressure of the fluid supplied to the inlet thereof, and by thus imposing the inlet pressure on the pilot valve in opposition to the impeller pressure, such variations are neutralized and do not affect the governor. The pressure of the fluid supplied to the pump is commonly 5 to 7 pounds per square inch, which is sufficient, upon its removal from the upper side of the pilot valve 32, to cause an unbalance of forces on the pilot valve 32 resulting in upward movement thereof and complete closing of the admission valve 15.

A restricted orifice 30 is provided in the pilot valve 32 and permits a restricted flow of fluid to the space 44. A check valve 41a is provided between the conduit 41 and the conduit section 40′, permitting flow from the former to the latter but preventing reverse flow. The purpose of this check valve is to prevent escape of fluid from the conduit section 40′ when pressure in the conduit 41 is released, as hereinafter explained, and the purpose of the fluid through the orifice 30 is to supply fluid for restoring and maintaining pressure in the conduit 41.

The load-responsive control mechanism constituting the present invention is indicated generally at 46. It includes a watt-meter device 47 having a solenoid 48, consisting of current coils 49 and 51, a voltage coil 52 and an iron core 53 disposed within the solenoid. The coils 49, 51 and 52 are connected to be responsive to the amperage and voltage of the current delivered by the generator 11 through the leads 13, and thus to exert an upward force on the core 53 proportional to the load carried by the generator 11.

A group of weights 54 is suspended from the core 53 by means of a rod 55, preferably made of brass or other non-magnetic material, and biases the core downwardly. A rod 55', also preferably made of brass, is attached to the upper end of the core and pivoted to one end of a floating lever 56. A stop 56' may be provided on the rod 55' to limit downward movement by abutment with a stationary part.

The watt-meter device 47 is given as an example of a load-responsive device. It will be apparent that any form of device responsive to a variable in the load conditions of the unit may be used.

The other end of the lever 56 is pivotally connected at 71 to a dash pot piston 57 disposed in a stationary dash-pot cylinder 58. A by-pass 59 permits a restricted flow of fluid between the upper and lower ends of the cylinder 58, and the rate of flow is controlled by a needle valve 61.

The lever 56 is connected intermediate its ends to the valve member 60 of a pressure-release or discharge valve 63. The valve 63 has a sleeve 64, in which are formed ports 65, which communicate through the conduit 41 with the space 44 above the pilot valve 32, and with ports 66 communicating with a drain conduit 67. The valve member 60 has a piston portion 62 disposed within the sleeve substantially above the ports 65 and a piston portion 68 normally disposed within the sleeve with its upper edge a small distance above the upper edges of the ports 66, thereby cutting off communication between the ports 65 and the ports 66 until the valve member 60 moves downwardly from normal position more than this distance.

A spring 69 is provided to take the weight of the valve member 60 and of the piston 57 and the downward forces transmitted thereto by the lever 56. As shown, this spring is a compression spring interposed between the valve 63 and a collar 70 on the stem of the valve member 60. The collar 70 is preferably screw-threaded on the stem, to provide adjustment of the distance which the valve member must move to uncover the ports 66.

The operation of the above-described embodiment is as follows:

The watt-meter iron core 53 is free to move upwardly with increases in load and downwardly with decreases in load. As long as the piston 57 of the dash-pot can move as rapidly as the core 53, the lever 56 fulcrums about the top end of the valve stem 60. Flow from one side to the other of the dash-pot piston 57 takes place through the passage 59 having an orifice provided with an adjustable needle 61, the needle 61 being adjusted to control the speed of the dash-pot piston. Just as soon as the core element 53 moves more rapidly than the piston 57 can move, then, for a given movement of the core element 53, to the extent that the dash-pot piston does not move correspondingly, to that extent is the valve member 60 moved. Movement of the valve member 60 is, therefore, dependent upon the rate of change of load.

Upward movement of the valve member 60, in consequence of rates of change of increasing load, have no effect on the governor mechanism, at 16, for the reason that interruption of communication between the ports 65 and 66 is not disturbed, the lower piston portion 68 of the valve member continuing to cut off communication between the ports 65 and 66. On the other hand, as soon as the valve member 60 moves downwardly, incident to rate of change of decreasing load, sufficiently to place the ports 65 and 66 in communication, then pressure on top of the pilot valve 32 is relieved, whereupon the latter moves to the upper end of its travel due to impeller pressure acting thereon and the operating piston 21 of the governor mechanism, at 16, follows the pilot valve 32 upwardly, thereby moving the admission valve 15 in a closing direction.

As downward movement of the valve member 60, incident to rates of change of decreasing load of sufficient magnitude, involves compression of the spring 69, it will be clear that, with the admission valve 15 closed, due to exceeding a predetermined rate of change of decreasing load, the energy stored in the spring 69 is effective to move the valve member 60 upwardly, the lever 56 fulcruming about the upper end of the watt-meter core member 53, and such movement occurring as rapidly as permitted by flow of liquid from one side to the other of the dash-pot piston 57. This upward movement of the valve member 60 by the spring 69 brings about interruption of communication between the ports 65 and 66, whereupon back-pressure is built up above the pilot valve 32 of the governor mechanism, at 16, and the latter resumes control of the turbine at the reduced or no load condition.

As will be more particularly hereinafter pointed out, the apparatus, responsive to the rate of change of load in a decreasing direction to close the admission valve 15, performs this operation quite rapidly, particularly when the turbine is unloaded as in case of opening of the circuit breaker, the rapidity of closing of the admission valve being such as to prevent acceleration of the turbine to such an extent as to close the throttle valve incident to tripping by the overspeed governor.

Figure 2:
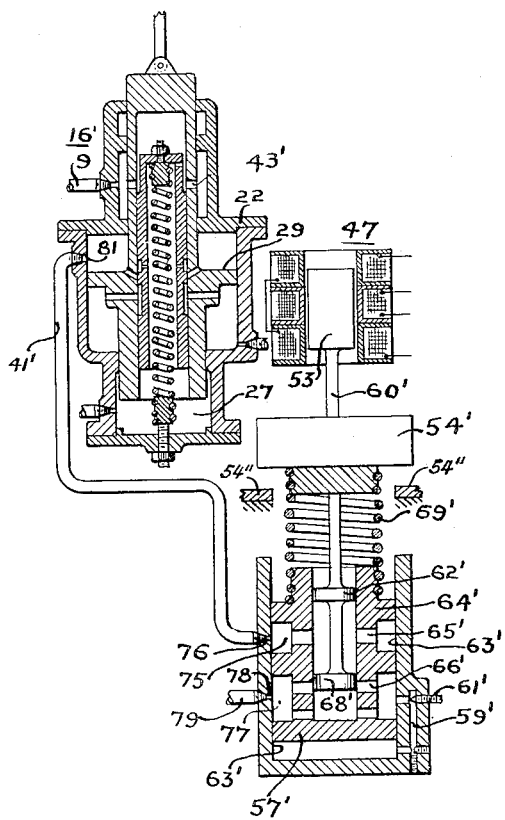
Fig. 2 shows a modified form of control mechanism.

In Fig. 2, I show a modified form of control mechanism, and a modified arrangement for controlling the governor to close the admission valve 15. The application of the control mechanism and governor to the turbine and generator is the same as in Fig. 1.

The watt-meter device 47 is the same as in Fig. 1, but in this case is directly connected to the valve member 60'. The latter is disposed within a hollow valve member 64' having a row of ports 65' and a row of ports 66'. The valve member 60' has piston portions 62' and 68', and the valve members 60' and 64' cooperate in the same manner as the valve member 60 and sleeve 64 of Fig. 1.

A spring 69' is interposed between the valve members 60' and 64' to bias said members to normal cut off positions relative to each other.

The valve member 64' is disposed within a cylinder 63', and has a recess 75 providing communication at all times between the ports 65' and a port 76 in the cylinder, and a second recess 77 providing communication between the ports 66' and a drain port 78 communicating with a drain conduit 79.

The bottom of the valve member 64' is formed as a piston 57' fitting within the cylinder 63' and the space therein below the piston communicates with the drain recess 77 through a passage 59' in which a needle valve 61' is provided to restrict the flow. A dash pot structure is thus provided to retard the rate of movement of the valve member 64'.

The governor 16' is identical with the governor 16 of Fig. 1 except that it is here shown as controlled to close the admission valve by releasing the fluid pressure above the piston 21 instead of the fluid pressure above the relay valve 32. The cylinder 22 is, therefore, provided with a port 81, and a conduit 41' provides communication between the ports 76 and 81. The ports 43' and a conduit 9 may be provided to drain the fluid leakage.

The operation of this embodiment is quite similar to that of the first embodiment.

As with the first embodiment, the watt-meter core member 53 moves upwardly with increasing load and downwardly with decreasing load, such movement being transmitted to the dash-pot piston structure 57' through the intermediary of the spring 69' as long as the dash-pot piston structure 57' can move as rapidly as the core; however, as soon as the core member 53 moves more rapidly than the dash-pot piston structure 57' can move, then displacement between the core member and the dash-pot piston structure occurs, that is, the piston valve member 60' moves the members 62' and 68' upwardly or downwardly in the cylinder provided in the dash-pot piston structure. Upward movement of the piston valve member 60', incident to rates of change of increasing load, produces no effect on the turbine for the reason that interruption of communication between the ports 65' and 66' continues. On the other hand, when the rate of change of decreasing load exceeds a predetermined amount and the piston member 60' moves relatively to the dash-pot piston structure 57' sufficiently to establish communication between the ports 65' and 66', then back pressure on the governor, at 16, is relieved and the latter is thereupon effective to move the controlling or admission valve in a closing direction.

As relative movement of the core member 53 and the dash-pot piston structure 57' takes place with deformation of the spring 69', it will be apparent that, incident to movement of the core member 53, the force of the spring 69' brings the dash-pot piston structure 57' back to normal relative position with respect to the core member. This movement is permitted by a flow of liquid through the orifice and the passage 59'. Hence, if the admission valve of the turbine is moved in a closing direction due to release of back pressure acting on the governor at 16 by the apparatus operating in response to exceeding a predetermined rate of change of declining load, and with the weight 54' resting on the stops 54" the spring 69' will be effective to move the dash-pot piston structure 57' so as to again bring about interruption of communication between the ports 65' and 66' whereupon pressure will be built up on the governor mechanism, at 16, and the latter will resume control of the admission valve at the no-load or reduced load condition.

Figure 3:
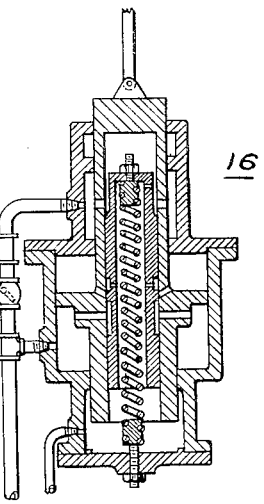
Fig. 3 shows a further modification of control mechanism.

In Fig. 3, I show a still further modified form of control mechanism. The mechanism includes a valve indicated generally at 85, which has a casing 86 into which a stem 87 extends. The stem 87 is connected to the core of a watt-meter or other load-responsive device and is biased upwardly by a force proportional to the load on the turbine in the same manner as in Figs. 1 and 2. In this case, the stem is biased downwardly by a spring 88 acting on a nut 89 screw-threaded on the stem.

A hollow valve member 91 is disposed in a cylindrical bore 92 formed in the casing 86, and is formed with an interior cylindrical bore 93 in which a piston 94 is disposed. The piston 94 is formed with an opening 95 through which an extension 96 of reduced diameter of the stem 87 projects and which is closed by the shoulder 97 of the stem 87 upon sufficient downward movement to abut the piston.

A compression spring 98 is interposed between the piston 94 and a nut 99 on the lower end of the extension 96 for biasing the piston upwardly relative to the stem 87. The piston is further provided with a restricted orifice 101.

The casing 86 is formed with an annular discharge port 102 communicating with the cylindrical bore 92 and with a drain passage 103. The casing is further formed with an annular port 104 communicating with the bore 92 and with the conduit 41 of Fig. 1 or the conduit 41' of Fig. 2 through an opening 105.

The valve member 91 is formed with an annular recess 106, which, upon sufficient downward movement, is adapted to provide communication between the annular ports 102 and 104. The valve member is biased upwardly by a spring 107, and its upward movement is limited by abutment with the cover 108 of the casing.

The recess 106 is disposed on the valve member with its lower edge a short distance above the upper edge of the annular port 104, when the valve member is at the upper end of its travel, so that a predetermined downward movement is required before the ports 102 and 104 are placed in communication.

The lower end of the hollow valve member 91 is closed and the interior thereof is filled with a suitable liquid, for example, lubricating oil, thereby forming a dash-pot of the piston 94 and the valve member, as will be readily understood.

The operation of this modification is as follows:

The stem 87 moves upwardly in response to increase in load and downwardly in response to decrease in load. As long as the piston 94 can move with the stem 87, it does so; however, due to the restricted orifice 101, the piston 94 acts as a dash-pot piston and rapidity of movement thereof is limited. Assuming that the stem 87 moves upwardly incident to increase in load, if the rate of change of increasing load is small enough, the piston 94 moves with the stem 87, but, if the stem 87 tends to move more rapidly than the piston 94 can move, then the opening 95 in the piston is uncovered by the shoulder or valve portion 97 provided on the stem 87, whereby fluid may readily flow from the space above the piston to the space therebelow, the spring 98 functioning to cause the piston 94 to follow the stem 87. As before, this upward movement, in consequence of increase in load, irrespective of the rate of change of increase in load, has no effect on the governing apparatus, the governor being fully capable of controlling the turbine with increases in load.

On the other hand, if the load should decrease, the stem 87 would move downwardly. As long as the piston 94 can move as fast as the stem 87, no effect is produced. However, if the decrease in load is sufficiently great and rapid, then the valve member 91 is moved downwardly against the force of the spring 107. If the decrease in load is sufficiently great, the valve member 91 will place the ports 102 and 104 in communication, whereby back pressure on the governing mechanism will be reduced and the latter will then be operated to move the admission valve in a closing direction. Assuming that the valve member 91 has been moved downwardly in this way to bring about operation of governing mechanism to close the admission valve, it will be apparent that energy stored in the spring 107 will be available to move the valve member 91 upwardly, this movement taking place as rapidly as permitted by the orifice 101, and the movement continuing until normal relation of the sleeve 91 with respect to the stem 87 is restored and communication between the ports 102 and 104 interrupted.

Referring further to Fig. 1, it will be noted that the throttle valve 110 is arranged in series with the admission valve 15, the throttle valve being biased for movement in a closing direction by the spring 111. The throttle valve is maintained open against the force of the biasing means due to fluid pressure acting on the piston 112, this pressure being supplied from the impeller 17' through a passage 113 communicating with the space of the cylinder 114 below the piston 112. The turbine is provided with an emergency or overspeed governor 115 of conventional type co-operating with a valve 116 arranged in the passage 113. In case of overspeed, the governor 115 operates the trip mechanism, at 117, thereby rendering the spring 118 effective to move the valve 116 so as to interrupt the supply of pressure medium from the impeller to the cylinder 114 and to place the latter in communication with the exhaust, whereupon the spring 111 is effective to move the throttle valve in a closing direction.

As hereinbefore pointed out, if the throttle valve is closed, delay is inevitable in resuming operation of the turbine. Hence, to reduce outages, closing of the throttle valve should be avoided if possible. Accordingly, the principal objective of the present invention is to prevent overspeeding of the turbine and consequent closure of the throttle valve incident to sudden decreases in load, as when the circuit breaker is opened, the mechanism operating in response to rate of change of declining load and superseding the governor, at 16, and bringing about closure of the admission valve, this operation taking place quite rapidly and long before it could be effected by the governor acting in response to speed change. As a matter of fact, under the condition of decrease in load such as assumed, the governor could not act quick enough to move the valve 15 in a closing direction in time to prevent overspeeding of the turbine to such a point as to operate the emergency or overspeed governor and cause closure of the throttle valve.

Therefore, it will be seen that I have provided a turbine having speed control governor mechanism and emergency or overspeed governor mechanism together with apparatus responsive to rate of change of declining load and operating to supersede the governor mechanism to bring about quick closing of the admission or regulating valve to prevent operation of the emergency or overspeed governor and closure of the throttle valve when the load on the turbine is suddenly reduced, the turbine continuing in operation for the reason that the governor mechanism resumes control of the admission valve as soon as permitted by the load responsive apparatus. Hence, the advantage of the present arrangement is to assure greater continuity of turbine operation and to reduce outages thereof incident to closure of the throttle valve brought about by sudden load reductions.

It will be seen that I have provided a simple and reliable control mechanism for effecting immediate closing of the admission valve when a heavy load is instantaneously removed, without waiting for any speed increase. It will also be apparent that the control mechanism normally permits the usual speed governor to control the prime mover, in that it does not interfere with the operation thereof during load increases, nor during normal load decreases, whether such decreases occur at light load or heavy load. A further advantage to be noted is that it inherently restores control by the governor after a lapse of time sufficient to enable the speed governor to adequately control the prime mover.

Although I have shown my control mechanism as controlling the governor, it is to be understood that this is merely one desirable arrangement, and that any arrangement whereby the control mechanism supersedes the governor control and effects closing the valves may be used.

While I have shown my invention in three forms, it will be obvious to those skilled in the art that it is not so limited, but is susceptible of various other changes and modifications without departing from the spirit thereof, and I desire, therefore, that only such limitations shall be place thereupon as are imposed by the prior art or as are specifically set forth in the appended claims.

What I claim is:—

1. The combination with a prime mover connected to a load, a regulating valve controlling the admission of motive fluid to the prime mover in accordance with the load, means operated by the prime mover for developing fluid pressure varying as a function of the speed of the prime mover, mechanism for actuating said regulating valve in response to said fluid pressure, said mechanism including means providing a back pressure opposing the effect thereon of said fluid pressure, and means effective, when a predetermined rate of change of declining load is exceeded, to reduce the back pressure acting on said mechanism so that said fluid pressure acting thereon is effective to secure operation thereof to move the regulating valve in a closing direction.

2. The combination with a prime mover connected to a load, a regulating valve controlling the admission of motive fluid to the prime mover, means operated by the prime mover for developing fluid pressure varying as a function of the speed of the prime mover, mechanism for actuating said regulating valve in response to said fluid pressure, said mechanism including means providing a back pressure opposing the effect thereon of said fluid pressure, and means effective, when a predetermined rate of change of declining load is exceeded, to relieve said back pressure to render said fluid pressure effective to actuate the mechanism to move the regulating valve in a closing direction.

3. In combination, a prime mover, a load connected to the prime mover, a regulating valve for controlling the admission of motive fluid to the prime mover in accordance with the load, a fluid-pressure-operated motor device for actuating the valve, speed responsive means operated by the prime mover for rendering the motor device effective to control the regulating valve, means for superseding the speed responsive means in controlling the motor device including a passage for exhausting pressure fluid from the motor device and a valve closing said passage when in normal position and when moved in one direction but opening said passage when moved to a sufficient extent in the other direction, and means responsive to predetermined rate of change of declining load to secure opening of said passage valve to provide for operation of the motor device to move the regulating valve in a closing direction.

4. In combination, a prime mover connected to a load; a regulating valve controlling the admission of motive fluid to the prime mover; governor mechanism including a fluid operated motor device for actuating the regulating valve; means for modifying the motor device so that fluid pressure applied thereto is effective to close the admission valve; said means including an exhaust passage, a valve, and a spring for biasing the valve to close the passage; mechanism effective, when a predetermined rate of change of declining load is exceeded to render said modifying means effective; said mechanism comprising a member movable in accordance with the load, a dash-pot including cylinder and piston members with means providing for restricted fluid flow from either side to the other of the piston member, and means utilizing movement of said load responsive member in excess of relative movement of the dash-pot members for effecting opening of the valve of said modifying means when the predetermined rate of change of declining load is exceeded.

OZRO N. BRYANT.